United States Patent
Soi et al.

(10) Patent No.: US 12,182,445 B2
(45) Date of Patent: Dec. 31, 2024

(54) NVMe COMMAND COMPLETION MANAGEMENT FOR HOST SYSTEM MEMORY

(71) Applicant: Micron Technology, Inc., Boise, ID (US)

(72) Inventors: Sahil Soi, Bangalore Urban (IN); Dhananjayan Athiyappan, Bangalore Urban (IN)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/886,369

(22) Filed: Aug. 11, 2022

(65) Prior Publication Data

US 2023/0214157 A1  Jul. 6, 2023

(30) Foreign Application Priority Data

Dec. 30, 2021 (IN) .............................. 202141061856

(51) Int. Cl.
G06F 3/06 (2006.01)

(52) U.S. Cl.
CPC .......... G06F 3/0659 (2013.01); G06F 3/0619 (2013.01); G06F 3/0679 (2013.01)

(58) Field of Classification Search
CPC .... G06F 3/0659; G06F 3/0611; G06F 3/0619; G06F 3/0679; G06F 3/061; G06F 3/0688; G06F 12/0875; G06F 12/0246; G06F 2212/452; G06F 13/4282
See application file for complete search history.

(56) References Cited

U.S. PATENT DOCUMENTS

| | | | |
|---|---|---|---|
| 9,626,309 B1* | 4/2017 | Burke | G06F 13/364 |
| 10,528,469 B2* | 1/2020 | Koo | G06F 12/0246 |
| 2009/0157971 A1* | 6/2009 | Liu | G06F 12/0886 |
| | | | 711/E12.016 |
| 2016/0034188 A1* | 2/2016 | Bisht | G06F 3/0655 |
| | | | 710/53 |
| 2017/0123656 A1* | 5/2017 | Benisty | G06F 3/0688 |
| 2017/0212800 A1* | 7/2017 | Sharma | G06F 3/065 |
| 2018/0018101 A1* | 1/2018 | Benisty | G06F 3/0659 |
| 2018/0150220 A1* | 5/2018 | Pandian | G06F 3/0659 |
| 2019/0042149 A1* | 2/2019 | Kesler | G06F 9/30 |
| 2020/0150898 A1* | 5/2020 | Byun | G06F 3/064 |
| 2020/0304142 A1* | 9/2020 | Nakanishi | H03M 7/3059 |

(Continued)

*Primary Examiner* — Tracy C Chan
(74) *Attorney, Agent, or Firm* — LOWENSTEIN SANDLER LLP (57) ABSTRACT

A processing device in a memory sub-system identifies an indication of a completion of a memory access command directed to a memory device and determines whether there are other memory access commands directed to the memory device that are pending. Responsive to determining that there are other memory access commands pending, the processing device coalesces additional indications of completions of the other memory access commands that are available within a threshold period of time with the indication of the completion into a completion data chunk and sends the completion data chunk to a host system. The host system is to store the completion data chunk as one or more completion queue entries in a completion queue in a host memory of the host system via a single host memory write operation.

20 Claims, 5 Drawing Sheets

(56) References Cited

U.S. PATENT DOCUMENTS

2021/0165691 A1* 6/2021 Diril .................... G06F 9/44505
2021/0181957 A1* 6/2021 Diril ..................... G06F 3/0673
2022/0091980 A1* 3/2022 Kayiran .............. G06F 13/1668

* cited by examiner

NVMe COMMAND COMPLETION MANAGEMENT FOR HOST SYSTEM MEMORY

RELATED APPLICATIONS

This application claims the benefit of India Provisional Patent Application No. 202141061856, filed Dec. 30, 2021, which is hereby incorporated by reference herein.

TECHNICAL FIELD

Embodiments of the disclosure relate generally to memory sub-systems, and more specifically, relate to NVMe command completion management for host system memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to NVMe command completion management for host system memory. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a NAND memory device, such as 3D flash NAND memory, which offers storage in the form of compact, high density configurations. Other examples of non-volatile memory devices are described below in conjunction with FIG. 1. A non-volatile memory device is a package of one or more die. Each die can consist of one or more planes. For some types of non-volatile memory devices (e.g., NAND memory devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types.

Memory access commands, such as those sent by the host system, request the memory sub-system to perform memory access operations on the memory devices contained therein. Memory access commands can generally be classified into respective categories, such as read commands, write commands, erase commands, move commands, etc. A memory sub-system controller can receive the memory access commands from the host system connected externally to the memory sub-system, such as via a Non-Volatile Memory Express (NVMe) interface on a Peripheral Component Interconnect Express (PCIe) communication bus. The memory sub-system can execute the memory access commands to perform the memory access operations and can store the results of the memory access commands for retrieval by the host system after the memory sub-system reports completion of the execution of the memory access commands.

In certain implementations, the host system can utilize a set of queues to track the memory access commands issued to the memory sub-system. For example, the host system can include a submission queue, storing submission queue entries representing the memory access commands issued to the memory sub-system, and a completion queue, storing completion queue entries received from the memory sub-system to indicate that the corresponding memory access commands have been executed. Typically, the host system can maintain these queues in a volatile host memory, such as a dynamic random access memory (DRAM) device), having an optimal write size granularity (e.g., 64 byte chunks) at which the host memory can be most efficiently written. A completion queue entry, however, may have a different size (e.g., 16 bytes), often smaller than the write size granularity of the host memory. Accordingly, conventional systems often resort to performing a masked write, when supported, or a read-modify-write operation if a masked write is not possible, in order to add newly received completion queue entries to the completion queue in the host memory. With a masked write of an individual completion queue entry, only a portion (e.g., one quarter) of the host memory write chunk size is written. Thus, multiple masked write operations are performed in order to fill the entire host memory write chunk. With a read-modify-write operation, the host memory chunk is read from the host memory, modified to include the newly received completion queue entry, and written back to the host memory. Thus, both masked write and read-modify-write operations have significant time penalties compared to performing a write of an entire host memory write chunk and can negatively impact host system performance. In addition, writing to the host system memory in data sizes smaller than the host memory write chunk size can hurt cache coherency.

Aspects of the present disclosure address the above and other deficiencies by implementing NVMe command completion management for efficient host system memory operation. In one embodiment, a completion manager component in the memory sub-system can take one of a number of actions when sending memory access operation completion data (e.g., completion queue entries) to a host system in order to optimize the process of writing the completion data to the host system memory. In one embodiment, when a completion queue entry is available and ready to send to the host system, the completion manager can append some amount of dummy data to the completion queue entry to form a packet that aligns with the write size granularity of the host memory. For example, if a 16 byte completion queue entry is available, and if the write size granularity of the host memory is 64 bytes, the completion manager can include 48 bytes of dummy data, such that a 64 byte chunk can be written to the completion queue of the host memory. In another embodiment, the completion manager can coalesce multiple completion queue entries together such that they can be written to the completion queue of the host memory as a single chunk having the optimal write size granularity. For example, if multiple 16 byte completion queue entries are available within a threshold period of time, the completion manager can coalesce up to four completion queue entries before writing them all together as a single chunk that is up to 64 bytes in size. In yet another embodiment, if less than a full chunk equal to the write size granularity is written to the host memory due to expiration of the threshold period of time, the completion manager can append dummy data to form a packet that aligns with the write size granularity.

Advantages of this approach include, but are not limited to, improved performance in the host system. Optimizing the writing of completion queue entries at the host system memory, by using either coalescing or dummy data, offers power savings, decreased latency, and performance improvements compared to masked write and read-modify-write operations, which can now be avoided. In addition, the bandwidth of the PCIe link between the memory sub-system and host system can be utilized more efficiently when transmitting completion data, as multiple completions are sent in a single PCIe transaction, rather than having a separate PCIe transaction for every completion.

Figure 1:
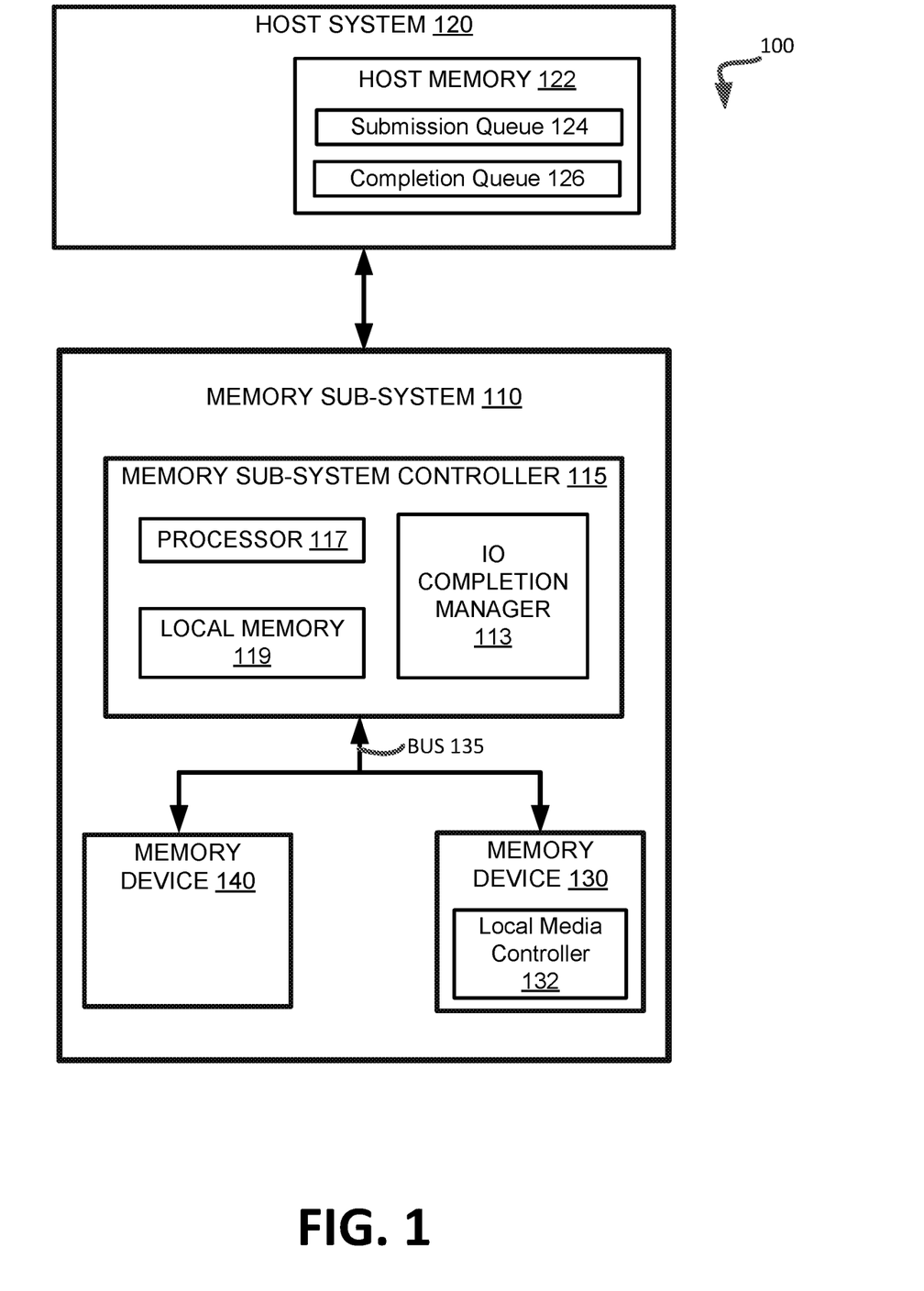
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controller 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 132) for media management within the same memory device package. An example of a managed memory device is a managed NAND (MNAND) device.

In one embodiment, the memory sub-system 110 includes input/output (IO) completion manager 113. In some embodiments, the memory sub-system controller 115 includes at least a portion of the IO completion manager 113. For example, the memory sub-system controller 115 can include a processor 117 (processing device) configured to execute instructions stored in local memory 119 for performing the operations described herein. In one embodiment, IO completion manager 113 performs NVMe command completion management for efficient host system memory operation. For example, responsive to memory sub-system controller 115 performing one or more memory access commands (e.g., read commands, write commands, erase commands, move commands, etc.) based on memory access requests received from a requestor, such as host system 120, IO completion manager can generate completion data to be sent back to the requestor to indicate that execution of the one or more memory access commands is complete. In one embodiment, this completion data can include a completion queue entry having a certain size (e.g., 16 bytes). Once generated, IO completion manager 113 can transmit the completion data back to host system 120.

In one embodiment, the host system 120 can utilize a set of queues to track the memory access commands issued to the memory sub-system 110. For example, the host system 120 can include a submission queue 124, storing submission queue entries representing the memory access commands issued to the memory sub-system 110, and a completion queue 126, storing completion queue entries received from the memory sub-system 110 to indicate that the corresponding memory access commands have been executed. In one embodiment, the host system 120 can maintain these queues in a host memory 122, such as a dynamic random access memory (DRAM) device or other non-volatile memory device. Submission queue 124 and completion queue 126 can include circular buffers with a fixed slot size. In one embodiment, host memory 122 has an optimal write size granularity (e.g., 64 byte chunks) at which the host memory 122 can be most efficiently written. In other embodiments, there can be some other number of queues or queue pairs in host memory 122, the write size granularity of host memory 122 can be different, and/or the size of a completion queue entry can be different. In general, however, the size of the completion queue entry is smaller than the write size granularity of host memory 122.

Depending on the embodiment, IO completion manager 113 can take any of a number of actions when sending memory access operation completion data (e.g., completion queue entries) to host system 120 in order to optimize the process of writing the completion data to the host memory 122. In one embodiment, when a completion queue entry is available and ready to send to host system 120, IO completion manager 113 can append some amount of dummy data to the completion queue entry to form a packet that aligns with the write size granularity of the host memory 122. For example, if a 16 byte completion queue entry is available, and if the write size granularity of the host memory is 64 bytes, IO completion manager 113 can include 48 bytes of dummy data, such that a 64 byte chunk can be written to the completion queue 126 of the host memory 122. In another embodiment, IO completion manager 113 can coalesce multiple completion queue entries together such that they can be written to the completion queue 126 of the host memory 122 as a single chunk having the optimal write size granularity. For example, if multiple 16 byte completion queue entries are available within a threshold period of time, IO completion manager 113 can coalesce up to four completion queue entries before writing them all together as a single chunk that is up to 64 bytes in size. In yet another embodiment, if less than a full chunk equal to the write size granularity is written to the host memory 122 due to expiration of the threshold period of time, IO completion manager 113 can append dummy data to form a packet that aligns with the write size granularity. Further details with regards to the operations of IO completion manager 113 are described below.

Figure 2:
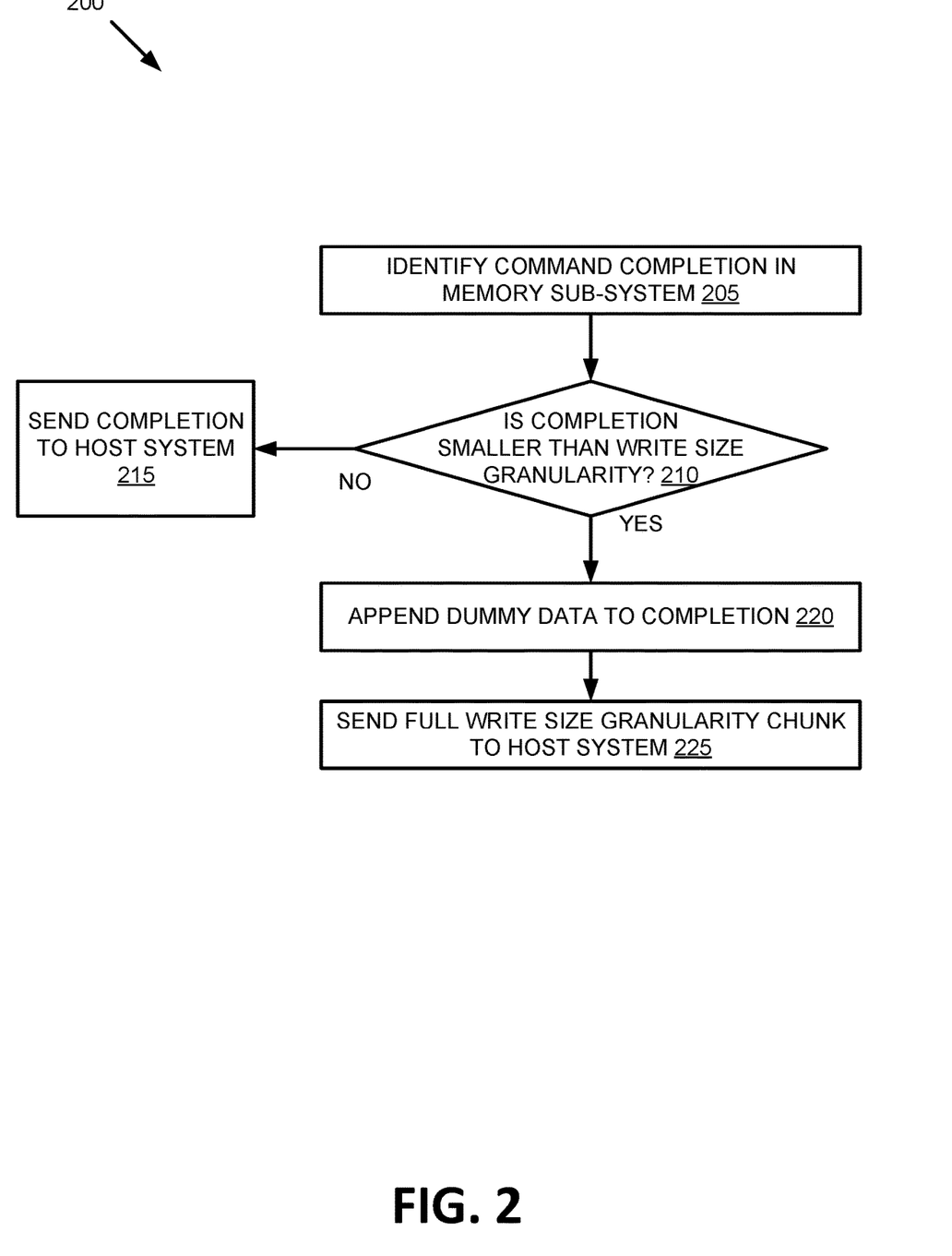
FIG. 2 is a flow diagram of an example method of NVMe command completion management for host system memory using appended dummy data in accordance with some embodiments of the present disclosure.

FIG. 2 is a flow diagram of an example method of NVMe command completion management for host system memory using appended dummy data in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by IO completion manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic identifies an indication of a completion of a memory access command directed to a memory device, such as memory device 130. In one embodiment, a controller, such as memory sub-system controller 115 can receive one or more memory access commands from a requestor, such as host system 120. The host system 120 can be connected externally to the memory sub-system 110, such as via an NVMe interface. The memory sub-system controller 115 can execute the one or more memory access commands to perform one or more corresponding memory access operations and can store the results of the memory access operations for retrieval by the host system 120 after IO completion manager 113 reports completion of the execution of the memory access operations. In response to completion of the execution of each memory access command, IO completion manager 113 can generate or identify an otherwise generated indication of the completion.

At operation 210, the processing logic can determine whether a size of the indication of the completion is smaller than a host memory write size granularity. In one embodiment, the host system 120 can maintain a completion queue 126, for example, in a volatile host memory 122, such as a DRAM device, having an optimal write size granularity (e.g., 64 byte chunks) at which the host memory can be most efficiently written. The indication of the completion, which can ultimately be stored in completion queue 126 as a completion queue entry, however, may have a different size (e.g., 16 bytes), often smaller than the write size granularity of the host memory. In one embodiment, IO completion manager 113 can compare the size of the indication to the known host memory write size granularity to determine whether the size of the indication of the completion is smaller than the host memory write size granularity.

Responsive to determining that the size of the indication of the completion is not smaller than the host memory write size granularity (i.e., that the size of the indication is at least equal to the host memory write size granularity), at operation 215, the processing logic can send the indication of the completion to the host system 120 as a full completion data chunk equal to the host memory write size granularity. Upon receiving the full completion data chunk, the host system 120 can store the full completion data chunk in completion queue 126.

Figure 3A:
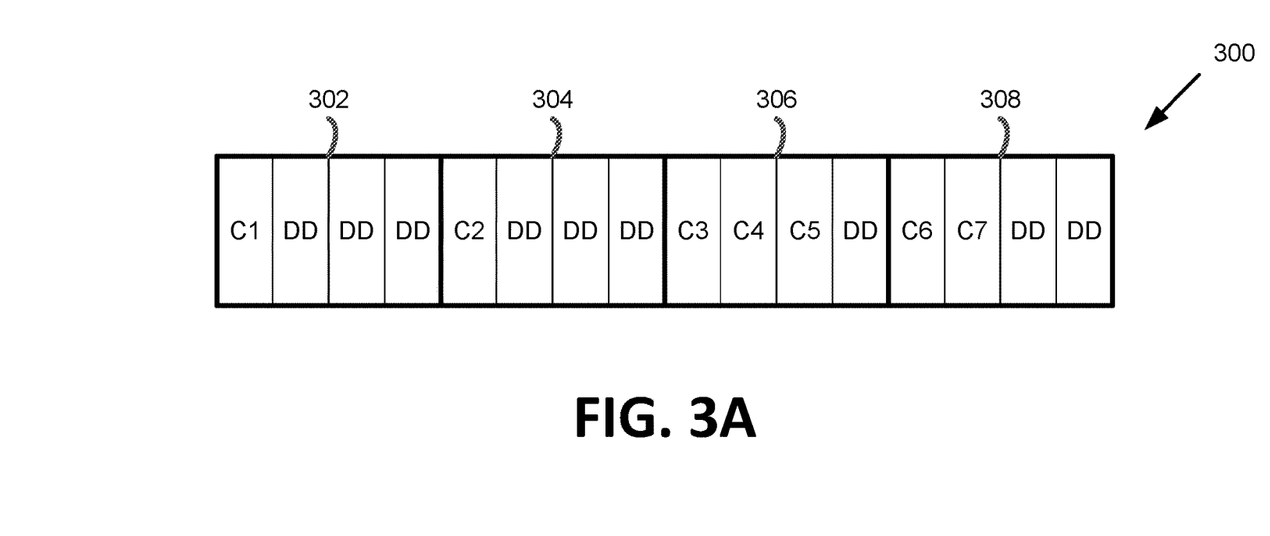
FIGS. 3A and 3B are block diagrams illustrating example NVMe command completion sequences in accordance with some embodiments of the present disclosure.

Responsive to determining that the size of the indication of the completion is smaller than the host memory write size granularity, however, at operation 220, the processing logic can append dummy data to the indication of the completion to form a full completion data chunk (i.e., a data chunk having a size equal to the host memory write size granularity). In one embodiment, the dummy data can include a random data pattern, a pseudo-random data pattern, all zeroes, all ones, etc. For example, as illustrated in FIG. 3A, the command completion sequence 300 includes a number of completion data chunks 302, 304, 306, and 308. Each of completion data chunks 302, 304, 306, and 308 are equal to the host memory write size granularity (e.g., 64 bytes or some other size). Completion data chunk 302 includes the indication of a completion C1 which has a size (e.g., 16 bytes) smaller than that of completion data chunk 302. Accordingly, IO completion manager 113 can append a number of dummy data elements DD to the indication of completion C1 to fill the remaining portion of completion data chunk 302. When a subsequent indication of a completion C2 is available, IO completion manager 113 can similarly append a number of dummy data elements DD to the indication of completion C2 to fill the remaining portion of completion data chunk 304.

At operation 225, the processing logic can sending the full completion data chunk, such as chunk 302, comprising the indication of the completion C1 and the dummy data DD to the host system 120. Upon receiving the full completion data chunk, the host system 120 can store the full completion data chunk in completion queue 126 of host memory 122 using a single host memory write operation.

Figure 4:
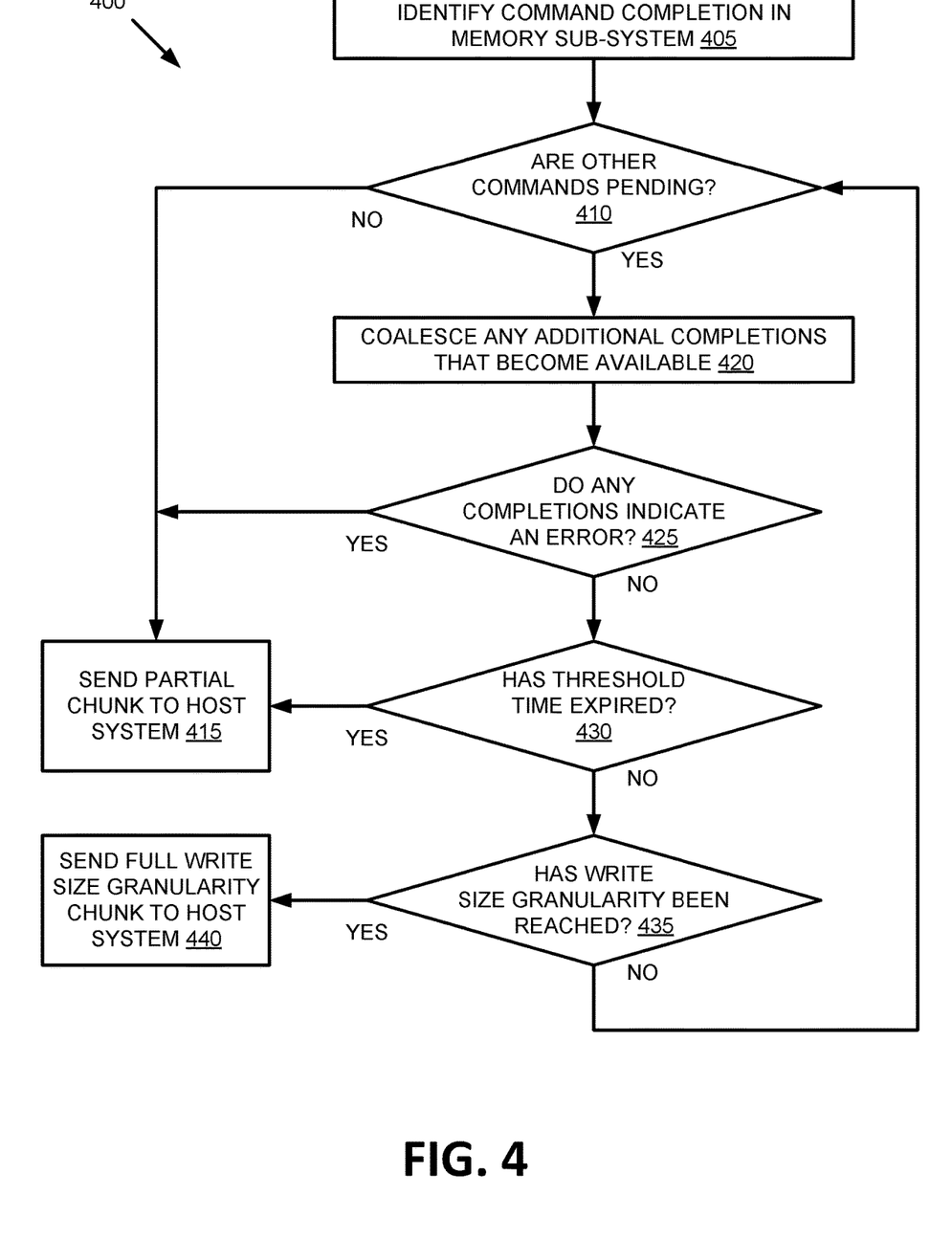
FIG. 4 is a flow diagram of an example method of NVMe command completion management for host system memory using completion coalescing in accordance with some embodiments of the present disclosure.

FIG. 4 is a flow diagram of an example method of NVMe command completion management for host system memory using completion coalescing in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by IO completion manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic identifies an indication of a completion of a memory access command directed to a memory device, such as memory device 130. In one embodiment, a controller, such as memory sub-system controller 115 can receive one or more memory access commands from a requestor, such as host system 120. The host system 120 can be connected externally to the memory sub-system 110, such as via an NVMe interface. The memory sub-system controller 115 can execute the one or more memory access commands to perform one or more corresponding memory access operations and can store the results of the memory access operations for retrieval by the host system 120 after IO completion manager 113 reports completion of the execution of the memory access operations. In response to completion of the execution of each memory access command, IO completion manager 113 can generate or identify an otherwise generated indication of the completion.

At operation 410, the processing logic can determine whether there are other memory access commands directed to the memory device 130 that are pending. In one embodiment, IO completion manager 113 tracks all memory access commands received at memory sub-system 110 (e.g., by adding an indication of a memory access command to a command queue) and tracks which memory access commands are completed (e.g., by removing the indication of the memory access command from the command queue and generating an indication of the completion. Thus, at any point in time, IO completion manager 113 can determine whether there are other commands that are pending (i.e., commands that have been received but have not yet been completed), as well as when those command are likely to be completed.

Responsive to determining that there are no other memory access commands pending, at operation 415, the processing logic can send the indication of the completion to the host system 120 as a partial completion data chunk. Since the size of the indication (e.g., 16 bytes) is likely less than the host memory write size granularity (e.g., 64 bytes) a full completion data chunk is not available. Since there are no other pending memory access commands, waiting for additional indications of completions of other memory access commands is impractical, and thus, in one embodiment, the indication of the completion can be sent alone to host system 120. In another embodiment, however, IO completion manager 113 can append dummy data to the indication of the completion to form a full completion data chunk equal to a host memory write size granularity, as illustrated by chunk 302 in FIG. 3A, for example.

Responsive to determining that there are other memory access commands pending, however, at operation 420, the processing logic can coalesce additional indications of completions of the other memory access commands that are available within a threshold period of time with the indication of the completion into a completion data chunk. In one embodiment, rather than sending the indication of the completion to host system 120 as soon as it is available, IO completion manager 113 can delay the sending and wait to see if any additional indications of completions of the other memory access commands become available within the threshold period of time (e.g., before the expiration of a timer set to a threshold value), such that the indications of multiple completions can be sent to the host system 120 together.

At operation 425, the processing logic can determine whether the indication of the completion of the memory access command or any of the additional indications of the completions of the other memory access commands indicate an error of a corresponding memory access operation. Generally, the indication of the completion in generated upon completion of a corresponding memory access operation and will indicate whether the memory access operation was successful or whether an error occurred. If an error has not occurred, IO completion manager 113 can safely coalesce the indication of the completion, as the indication of a successful completion is not as time sensitive. If an error has occurred, however, IO completion manager 113 may not coalesce the indication and can instead send the send the indication of the completion to the host system 120 as a partial completion data chunk at operation 415.

Figure 3B:
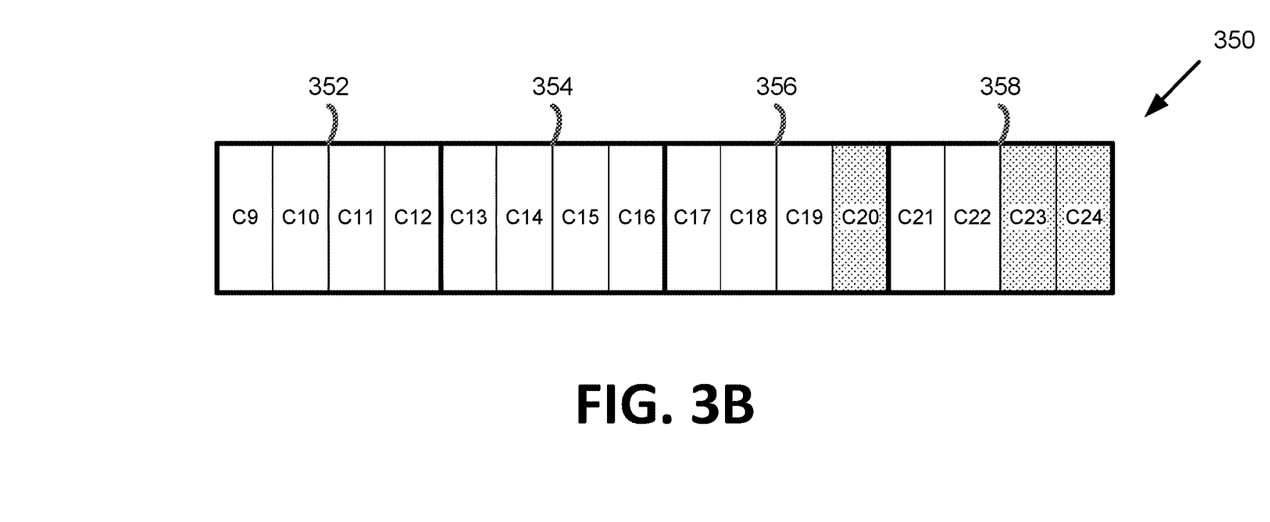

At operation 430, the processing logic determines whether a threshold period of time has expired. In one embodiment, IO completion manager 113 maintains a counter (or set of counters) which is initialized to a configurable initial value representing the threshold period of time. When the command completion is identified at operation 405, the counter begins a countdown to zero, and thus will expire after the threshold period of time has passed. Responsive to the threshold period of time having expired (i.e., the timer having reach zero), the processing logic can send a completion data chunk to the host system 120 including any indications of completions having been coalesced up to that point. In one embodiment, the completion data chunk comprises a partial completion data chunk having a smaller size than a host memory write size granularity. For example, as illustrated in FIG. 3B, the command completion sequence 350 includes a number of completion data chunks 352, 354, 356, and 358. Each of completion data chunks 352, 354, 356, and 358 are equal to the host memory write size granularity (e.g., 64 bytes or some other size). Completion data chunk 352 includes the indications of multiple completions C17-C20, each of which has a size (e.g., 16 bytes) smaller than that of completion data chunk 352. In one embodiment, completions C17, C18, and C19 can be available when the threshold period of time has expired, for example. Although, completions C17, C18, and C19 together are still smaller than the host memory write size granularity, in one embodiment, these completions can be sent to host system 120 together. Host system 120 can write the completions C17, C18, and C19 to completion queue 126. In another embodiment, however, IO completion manager 113 can append dummy data to the indications of the completions to form a full completion data chunk equal to a host memory write size granularity, as illustrated by chunk 306 in FIG. 3A, for example.

Subsequently, once the indication of completion C20 is available in memory sub-system 115, IO completion manager 113 can send the indication of completion C20 to host system 120 immediately (i.e., without coalescing) since the indication of completion C20 is the only remaining completion in completion data chunk 356. If, however, completions C21 and C22 are available when the threshold period of time ends, completions C21 and C22 can be sent to host system 120. Once the indication of completion C23 is subsequently available, IO completion manager 113 can coalesce the indication of completion C23 until the indication of completion C24 is available (assuming C24 is available within a threshold period of time of C23) since completions C23 and C24 together will complete the completion data chunk 358.

Responsive to the threshold period of time not having expired, at operation 435, the processing logic determines whether a size of the coalesced indications has reached the host memory write size granularity. In one embodiment, IO completion manager 113 compares the size of the coalesced indications to the host memory write size granularity (or a number of coalesced indications to a threshold number). Responsive to determining that the size of the coalesced indications has not reached the host memory write size granularity, the processing logic can continue to coalesce additional indications of completions of the other memory access commands (e.g., return to operation 410).

Responsive to determining that the size of the coalesced indications has reached the host memory write size granularity, however, at operation 440, the processing logic sends the completion data chunk to the host system 120. In one embodiment, the completion data chunk comprises a full completion data chunk equal to the host memory write size granularity. For example, as illustrated in FIG. 3B, completion data chunk 352 includes indications of completions C9, C10, C11, and C12, all of which can be sent to host system 120 together. The host system 120 can store the full completion data chunk as one or more completion queue entries in completion queue 126 in host memory 122 via a single host memory write operation.

Figure 5:
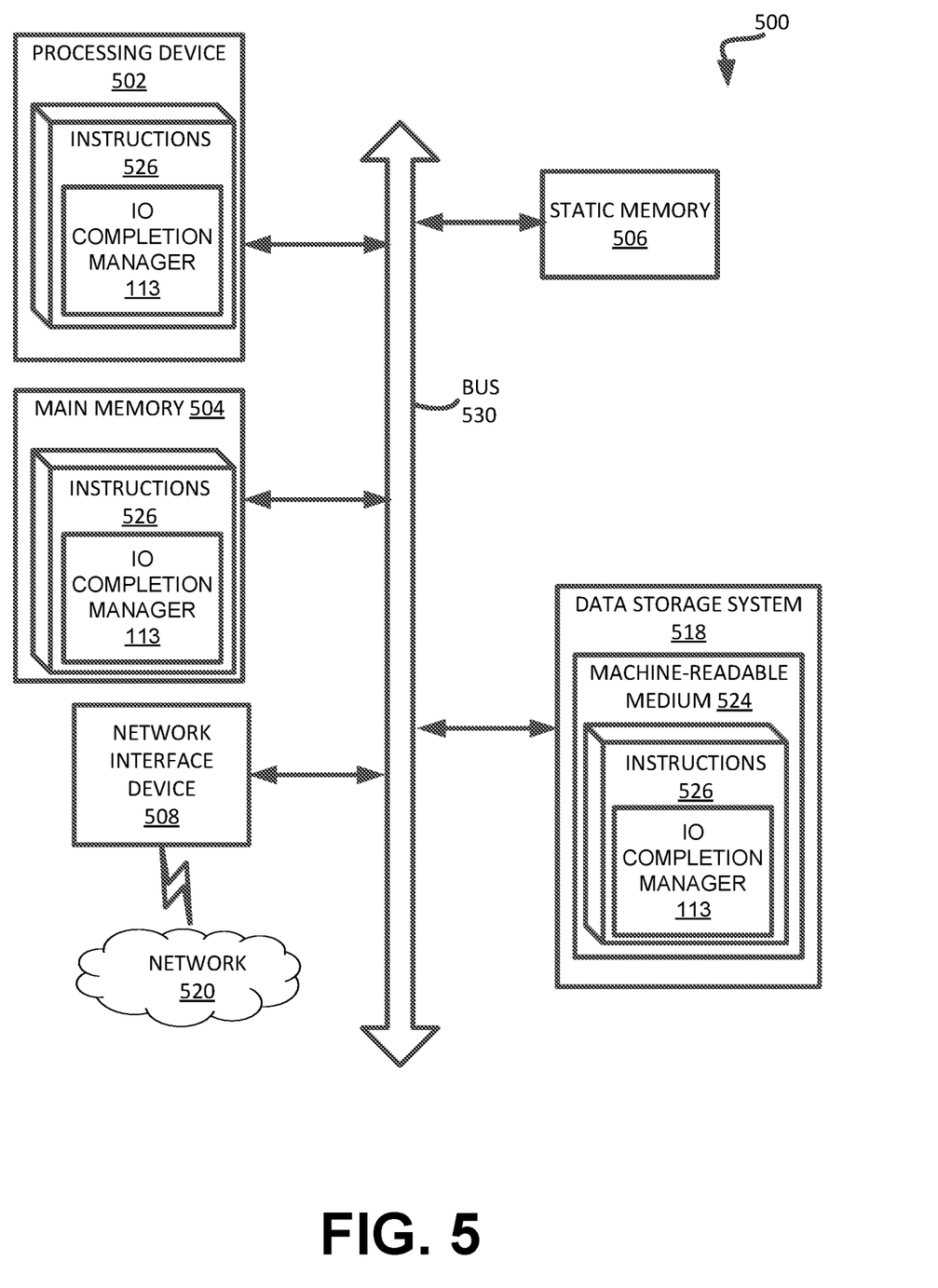
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the IO sequencer 111 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the IO sequencer 111 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
identifying an indication of a completion of a memory access command directed to the memory device;
determining whether there are other memory access commands directed to the memory device that are pending;
responsive to determining that there are other memory access commands that are pending and have not yet been completed, waiting for a threshold period of time to expire before sending the indication of the completion to a host system;
responsive to determining that the threshold period of time has expired, coalescing additional indications of completions of the other memory access commands that have since completed and are available with the indication of the completion into a completion data chunk; and
sending the completion data chunk to the host system, the host system to store the completion data chunk as one or more completion queue entries in a completion queue in a host memory of the host system via a single host memory write operation.

2. The system of claim 1, wherein the processing device is to perform operations further comprising:
responsive to determining that there are no other memory access commands pending, sending the indication of the completion to the host system as a partial completion data chunk, wherein the partial completion data chunk has a smaller size than a host memory write size granularity.

3. The system of claim 1, wherein the processing device is to perform operations further comprising:
responsive to determining that there are no other memory access commands pending, appending dummy data to the indication of the completion to form a full completion data chunk equal to a host memory write size granularity; and sending the full completion data chunk comprising the indication of the completion and the dummy data to the host system.

4. The system of claim 1, wherein the processing device is to perform operations further comprising:
determining whether the indication of the completion of the memory access command or any of the additional indications of the completions of the other memory access commands indicate an error of a corresponding memory access operation; and
responsive to there being an indication of an error, sending the indication of the error to the host system without waiting for the threshold period of time to expire.

5. The system of claim 1, wherein coalescing the additional indications of completions of the other memory access commands that are available within the threshold period of time into the completion data chunk comprises:
determining whether the threshold period of time has expired; and
responsive to the threshold period of time having expired, sending the completion data chunk to the host system, wherein the completion data chunk comprises a partial completion data chunk having a smaller size than a host memory write size granularity.

6. The system of claim 1, wherein coalescing the additional indications of completions of the other memory access commands that are available within the threshold period of time into the completion data chunk comprises:
determining whether the threshold period of time has expired;
responsive to the threshold period of time having expired, appending dummy data to the additional indications of completions to form a full completion data chunk equal to a host memory write size granularity; and
sending the full completion data chunk comprising the indications of the completions and the dummy data to the host system.

7. The system of claim 5, wherein coalescing the additional indications of completions of the other memory access commands that are available within the threshold period of time into the completion data chunk comprises:
responsive to the threshold period of time not having expired, determining whether a size of the coalesced indications has reached the host memory write size granularity; and
responsive to determining that the size of the coalesced indications has reached the host memory write size granularity, sending the completion data chunk to the host system, wherein the completion data chunk comprises a full completion data chunk equal to the host memory write size granularity.

8. The system of claim 7, wherein coalescing the additional indications of completions of the other memory access commands that are available within the threshold period of time into the completion data chunk comprises:
responsive to determining that the size of the coalesced indications has not reached the host memory write size granularity, continuing to coalesce additional indications of completions of the other memory access commands.

9. A method comprising:
identifying an indication of a completion of a memory access command directed to a memory device;
determining whether there are other memory access commands directed to the memory device that are pending;
responsive to determining that there are other memory access commands that are pending and have not yet been completed, waiting for a threshold period of time to expire before sending the indication of the completion to a host system;
responsive to determining that the threshold period of time has expired, coalescing additional indications of completions of the other memory access commands that have since completed and are available with the indication of the completion into a completion data chunk; and
sending the completion data chunk to the host system, the host system to store the completion data chunk as one or more completion queue entries in a completion queue in a host memory of the host system via a single host memory write operation.

10. The method of claim 9, further comprising:
responsive to determining that there are no other memory access commands pending, sending the indication of the completion to the host system as a partial completion data chunk, wherein the partial completion data chunk has a smaller size than a host memory write size granularity.

11. The method of claim 9, further comprising:
responsive to determining that there are no other memory access commands pending, appending dummy data to the indication of the completion to form a full completion data chunk equal to a host memory write size granularity; and
sending the full completion data chunk comprising the indication of the completion and the dummy data to the host system.

12. The method of claim 9, further comprising:
determining whether the indication of the completion of the memory access command or any of the additional indications of the completions of the other memory access commands indicate an error of a corresponding memory access operation; and
responsive to there being an indication of an error, sending the indication of the error to the host system without waiting for the threshold period of time to expire.

13. The method of claim 9, wherein coalescing the additional indications of completions of the other memory access commands that are available within the threshold period of time into the completion data chunk comprises:
determining whether the threshold period of time has expired; and
responsive to the threshold period of time having expired, sending the completion data chunk to the host system, wherein the completion data chunk comprises a partial completion data chunk having a smaller size than a host memory write size granularity.

14. The method of claim 9, wherein coalescing the additional indications of completions of the other memory access commands that are available within the threshold period of time into the completion data chunk comprises:
determining whether the threshold period of time has expired;
responsive to the threshold period of time having expired, appending dummy data to the additional indications of completions to form a full completion data chunk equal to a host memory write size granularity; and
sending the full completion data chunk comprising the indications of the completions and the dummy data to the host system.

15. The method of claim 13, wherein coalescing the additional indications of completions of the other memory access commands that are available within the threshold period of time into the completion data chunk comprises:

responsive to the threshold period of time not having expired, determining whether a size of the coalesced indications has reached the host memory write size granularity; and responsive to determining that the size of the coalesced indications has reached the host memory write size granularity, sending the completion data chunk to the host system, wherein the completion data chunk comprises a full completion data chunk equal to the host memory write size granularity.

16. The method of claim 15, wherein coalescing the additional indications of completions of the other memory access commands that are available within the threshold period of time into the completion data chunk comprises:

responsive to determining that the size of the coalesced indications has not reached the host memory write size granularity, continuing to coalesce additional indications of completions of the other memory access commands.

17. A system comprising:
a memory device; and
a processing device, operatively coupled with the memory device, to perform operations comprising:
identifying an indication of a completion of a memory access command directed to the memory device;
determining whether there are other memory access commands directed to the memory device that are pending;
responsive to determining that there are other memory access commands pending, determining whether a size of the indication of the completion is smaller than a host memory write size granularity;
responsive to determining that the size of the indication of the completion is smaller than the host memory write size granularity, appending dummy data to the indication of the completion to form a full completion data chunk; and
sending the full completion data chunk comprising the indication of the completion and the dummy data to a host system.

18. The system of claim 17, wherein the host system is to store the full completion data chunk as one or more completion queue entries in a completion queue in a host memory of the host system via a single host memory write operation.

19. The system of claim 18, where the full completion data chunk is equal to a host memory write size granularity of the host memory.

20. The system of claim 19, wherein the processing device is to perform operations further comprising:
responsive to determining that the size of the indication of the completion is not smaller than the host memory write size granularity, sending the indication of the completion to the host system as a full completion data chunk equal to the host memory write size granularity.

* * * * *